J. H. RAYMAKER.
VALVE.
APPLICATION FILED MAY 20, 1911.
1,028,134.
Patented June 4, 1912.
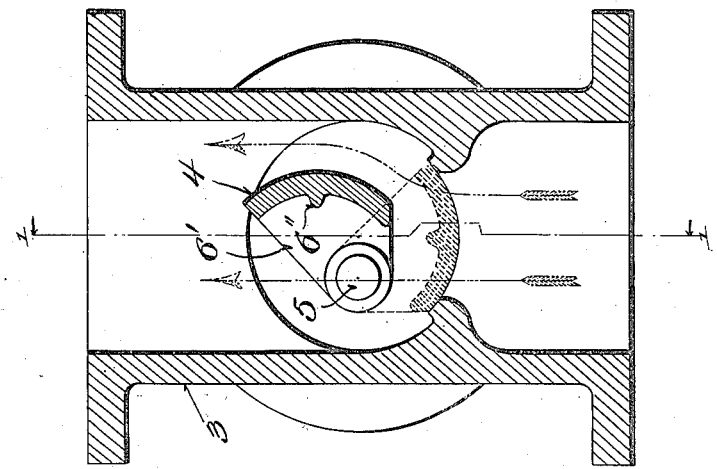
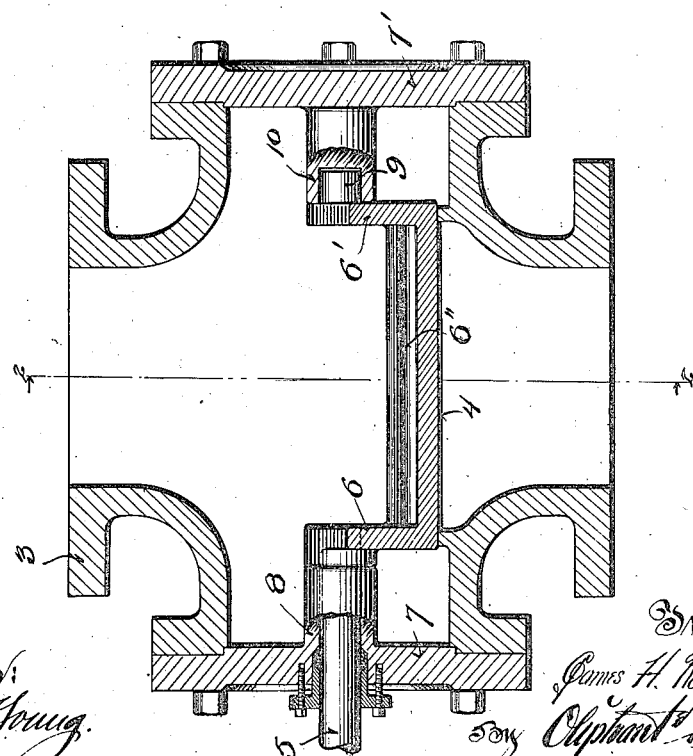

UNITED STATES PATENT OFFICE.

JAMES H. RAYMAKER, OF SHEBOYGAN, WISCONSIN.

VALVE.

1,028,134.  Specification of Letters Patent.  Patented June 4, 1912.

Application filed May 20, 1911. Serial No. 628,389.

*To all whom it may concern:*

Be it known that I, JAMES H. RAYMAKER, a citizen of the United States, and resident of Sheboygan, in the county of Sheboygan and State of Wisconsin, have invented certain new and useful Improvements in Valves; and I do hereby declare that the following is a full, clear, and exact description thereof.

My invention consists in what is herein particularly set forth with reference to the accompanying drawings and pointed out in the claims of this specification, its object being to provide simple, economical and efficient anti-friction Corliss-type valves especially designed as steam-engine stop-valves, their faces in a transverse direction being curvilinear and eccentric to stems with which said valves have rotary movement in their casings to seat and unseat.

Figure 1 of the drawings represents a sectional view of one of my improved valves and its casing partly in elevation on the plane indicated by line 1—1 in the other figure of said drawings, and Fig. 2, a similar view on the plane indicated by line 2—2 in Fig. 1, the valve being shown open in full lines and seated in dotted lines.

Referring by numerals to the drawings, 3 indicates the casing for a valve in accordance with my invention, 4 the valve and 5 the valve-stem. In any form of the valve its face is curvilinear transversely thereof and eccentric to the stem with which it is rigidly connected to have rotary seating and unseating movement in the casing. In its preferred form, the valve is a plate curvilinear in cross-section and having approximately triangular end wings 6, 6′ and a stiffening rib 6″ integral therewith, the wings being at right-angles to the plate.

The inner end of the stem 5 is fast in the wing 6 of the valve, and a detachable head 7 of the casing is provided with a stuffing-box bearing 8 for said stem. The other valve-wing 6′ is shown provided with a journal-lug 9 in line with the stem 5, and another detachable head 7′ of the casing is provided with a bearing 10 for the lug.

The face of the valve-seat in the casing 3 conforms to the face of the valve, the two being of the same radius, and because of the eccentricity of its face to the stem 5, the valve is only in touch with its seat when at its greatest throw in seating direction, there being immediate rocking clearance of said seat by said valve, when the latter is started upon its movement to obtain clearance in the casing. The rotary movement of the valve in either direction of throw is eccentric to the arc of its seat, whereby friction is eliminated, and there is no liability of said valve to stick, notwithstanding that it closes tight upon said seat with which it is then concentric as shown by dotted lines in Fig. 2.

I claim:

1. A valve consisting of a plate curvilinear in cross-section and having end wings integral therewith and at right-angles thereto, a stem rigid with one of the valve-wings and eccentric to the valve-face, a journal lug projecting from the other of the valve-wings in line with the stem, and a valve-casing provided with bearings for said stem and lug.

2. A valve consisting of a plate curvilinear in cross-section and having end wings integral therewith and at right-angles thereto, a stem rigid with one of the valve-wings and eccentric to the valve-face, a journal lug projecting from the other of the valve-wings in line with the stem, and a valve-casing having detachable heads provided with bearings for said stem and lug.

In testimony that I claim the foregoing I have hereunto set my hand at Sheboygan in the county of Sheboygan and State of Wisconsin in the presence of two witnesses.

JAMES H. RAYMAKER.

Witnesses:
  LOUIS GUTSCH,
  A. C. REY.